United States Patent Office 3,399,956
Patented Sept. 3, 1968

3,399,956
PROCESS FOR CONVERTING MONOVALENT THALLIUM COMPOUNDS TO TRIVALENT THALLIUM COMPOUNDS
Isao Hirose, Kazutoshi Funahashi, and Takeshi Fujii, Iwakuni-shi, Japan, assignors to Teijin Limited, Kita-ku, Osaka, Japan, a corporation of Japan
No Drawing. Filed Apr. 22, 1965, Ser. No. 450,200
Claims priority, application Japan, May 1, 1964, 39/24,771; Jan. 19, 1965, 40/2,638, 40/2,639
8 Claims. (Cl. 23—23)

ABSTRACT OF THE DISCLOSURE

A process for converting monovalent thallium compounds to trivalent thallium compounds by contacting the monovalent thallium compound with molecular oxygen in an acidic aqueous medium containing a chloride or bromide ion and an ion of a redox metal. The metal ions are generally selected from: copper, mercury, chromium, manganese, iron, cobalt, and nickel.

---

The present invention relates to a process for oxidizing monovalent thallium compounds.

More particularly, the invention relates to a process for converting monovalent thallium compounds to trivalent thallium compounds by means of oxidation.

Heretofore, trivalent thallium compounds (hereinafter may be referred to by an abbreviated indication of Tl III) have been known for their utility as oxidizing agents, for example, in oxidation of olefins to produce glycols.

However, with the progress of such oxidation reaction, trivalent thallium compounds are reduced to monovalent thallium compounds (hereinafter may be referred to as Tl I). For instance, in the abovementioned oxidation of olefins, 1 mol of Tl III is reduced to Tl I per mol of the glycol formed.

The thus formed Tl I is relatively hard to oxidize and in the past only relatively expensive processes such as oxidation with molecular chlorine gas or aqua regia or by electrochemical means have been known for conversion of Tl I to Tl III, and for this reason scarcely any attempt has been made for the conversion on an industrial scale.

Furthermore, among the above processes, that using molecular chlorine gas has a deficiency in that the consumption of chlorine gas is great because the chlorine gas is recovered as hydrochloric acid, and that of using aqua regia is objectionable because of corrosion of equipments, operational difficulties and increased cost. Again the electrochemical process can hardly be advantageous because of equipment problems.

Whereas, according to the present invention, it is found that monovalent thallium compounds can be readily converted to trivalent thallium compounds by treating the former with oxygen in an acidic aqueous medium in the presence of at least one type of ion selected from the group consisting of chloride ion and bromide ion, and an ion of a redox metal which is oxidizable with oxygen.

In the subject process, simple substances or compounds of such metals as copper, mercury, chromium, manganese, iron, cobalt and nickel may be named as the metals which give the ions of redox metals which are oxidizable with oxygen. And, as the compounds of those metals any form may be used so long as the compounds can release the metallic ions in an acidic aqueous medium containing chloride ion and/or bromide ion, i.e., under the conditions employed in the present process. Preferred examples of such compounds include copper bromide, copper chloride, iron bromide, iron chloride, copper oxide, iron oxide, basic copper carbonate, copper sulfate and iron sulfate. Generally as those metallic compounds, all salts of the metals with inorganic and organic acids are useful. Inter alia, they can be conveniently used in the forms of chlorides and/or bromides. Again, these metallic compounds may be of the metals at low valency state or high valency state at the time of addition.

As the aqueous medium used in the present invention, water is most preferred, but any aqueous medium such as methanol, ethanol, various glycols and aqueous solutions of water-soluble organic compounds such as acetone can be used.

According to the present invention, those aqueous media are used at acidic state, having a pH of preferably no more than 6, particularly no more than 4.

In order to cause the presence of chloride ion and/or bromide ion in such an acidic aqueous medium, the simplest means will be to add hydrochloric acid and/or hydrobromic acid to the medium. However, in the present invention any means may be employed so long as the presence of chloride ion and/or bromide ion in the acidic aqueous medium is achieved. And, according to the present invention bromide ion has a greater reactivity than chloride ion.

Furthermore, in the present invention it is permissible to add to the acidic aqueous medium, as the supply source of chloride ion and/or bromide ion, chloride or bromide of alkali metals or alkaline earth metals, or chloride or bromide of such metals with suitable acid. The addition of such chloride or bromide of alkali metals or alkaline earth metals besides hydrochloric acid and/or hydrobromic acid to the medium is preferred in the present invention for smoother progress of the oxidation reaction of monovalent thallium compounds.

The monovalent thallium compounds to be oxidized in accordance with the present invention may be any as long as at least a portion thereof is soluble in the acidic aqueous medium employed in this invention. For example, any of inorganic acid salts of thallium such as chlorides, bromides, sulfates and nitrates; oxides and hydroxides; and organic acid salts such as acetates may be used.

Therefore the above monovalent thallium compounds many be soluble or hardly-solube in the acidic aqueous medium used in the present invention. Depending on the solubility of the particular monovalent thallium compound used, the reaction advances in the state ranging from aqueous solution to suspension. In any case, with the progress of the reaction the Tl I compound is converted to the corresponding water-soluble Tl III compound dissolved in the acidic aqueous medium.

According to the present invention, as the oxygen source not only air and molecular oxygen but also nascent state oxygen may be used. Therefore, any of hydrogen peroxide, ozone and peroxides may be used, although the reaction progresses with sufficient smoothness when air is used in accordance with this invention.

In the invention, the higher the reaction temperature, the greater the reaction speed. It is unnecessary, however, to employ an excessively high temperature. Normally the reaction proceeds either at atmospheric or elevated pressures, and the reaction temperature may range from room temperature to boiling point of the reaction liquid (about 100° C. or higher) or can be higher. Excessively high reaction temperatures in no way hinder the operability of the subject process, but temperatures higher than boiling point of the reaction liquid are not particularly advantageous. The reaction system normally becomes heterogeneous such as gas-liquid, or rather, generally gas-liquid-solid and therefore it is desirable to consider the employment of engineering means to promote the reaction such as mechanical agitation, air agitation, shaking or use of surface active agent, to sufficiently transfer and mix the reactants.

In practicing the process of this invention, excessive sulfuric acid, acetic acid or organic solvent, etc., may be added to the reaction system for increasing solubility or Tl I or for performing the reaction at a state more close to gas-liquid system.

Presence of still other acids, salts, etc., in the reaction system is in no way deleterious, but addition of salt or base which neutralizes hydrogen bromide or hydrogen chloride, or which impairs or offsets the effect of said hydrogen bromide or chloride (for example, sodium acetate), or addition of substances such as potassium iodide and sodium iodide which have the activity of reducing Tl III to Tl I, should preferably be avoided.

Thus according to the present invention, monovalent thallium compounds can be readily converted to trivalent thallium compounds, and the acidic aqueous medium containing the trivalent thallium compound as obtained directly from the subject process can be used as it is, or after certain suitable treatment such as neutralization as an oxidation catalyst of olefin, etc., in the solution form.

The trivalent thallium compound may also be separated from the aqueous medium containing the said compound as obtained in the subject process by such means as neutralization, precipitation and evaporation of solvent. Also by use of anion exchange resin, the compound can be very easily recovered in the form $TlCl_4^-$ or $TlBr_4^-$.

Since Tl III can be thus readily obtained from Tl I acording to the present invention by consumption of substantially solely air, as a process for converting monovalent thallium compound to trivalent thallium compound the subject invention is highly advantageous compared with the conventional processes using chlorine gas or aqua regia.

In this invention such metals or metallic compounds as the supply source of ions of redox metals which are oxidizable with oxygen, as copper and iron, function as electron acceptor at the time of conversion of monovalent thallium compounds to trivalent thallium compounds, which presumably are again constantly converted back to the high valency metals or metallic compounds by the activity of mainly oxygen under the conditions employed for the subject process. Thus in any case monovalent thallium compounds are converted to trivalent thallium compounds without substantial consumption of such metals or metallic compounds in accordance with the present invention.

As the result it is made possible, for example, to convert the Tl I, which is side-produced in a considerably large amount in the production of glycols by oxidation of olefins, to the corresponding Tl III and recycle and again use the same for the oxidation reaction of olefins with advantage. Furthermore, according to this invention, the side-produced liquid containing the thallium compound used for oxidation reaction of olefin can be used as it is or after suitable treatment as the starting material of the subject process, i.e., as the source of monovalent thallium compounds.

The following working examples are given for a still more detailed explanation of the subject invention.

EXAMPLE 1

In 250 ml. of an aqueous solution of hydrochloric acid having a concentration of 12 mol/l., 1.2 g. of cupric ($CuCl_2 \cdot 2H_2O$) were dissolved, and further in the solution 4.0 g. of thallous chloride (TlCl) were suspended (suspension concentration, 0.067 mol/l.). Then the system was put in a reactor provided with an air inlet and a stirrer, into which air was blown while the system was violently stirred. Thus the reaction was performed at varied temperatures as indicated in Table 1. The molar ratio of $CuCl_2/TlCl$ employed was 0.45.

The content of the reactor (super-natant portion) was occasionally taken out each time in a small amount, and the thallic compound (Tl III) concentration was determined each time by means of potentiometric titration. The results are shown in Table 1 below. (Unless otherwise indicated, in all of the following examples the thallic compound concentration was determined by the same titration means.)

TABLE

| Reaction temp. (° C.) | Reaction time (hour) | Amount of $TlCl_3$ formed (mol/l.) |
| --- | --- | --- |
| 10±2 | 0.5 | |
| | 1.0 | |
| | 2.0 | |
| | 3.0 | 0.009 |
| | 5.0 | 0.010 |
| 40±2 | 0.5 | 0.016 |
| | 1.0 | 0.020 |
| | 2.0 | 0.025 |
| | 3.0 | 0.030 |
| | 5.0 | 0.036 |
| 70±5 | 0.5 | 0.025 |
| | 1.0 | 0.039 |
| | 2.0 | 0.064 |
| | 3.0 | [1] 0.089 |
| | 5.0 | |

[1] The Tl III concentration was higher than Tl I concentration because the suspension concentration was raised due to the repetitive sampling for the analysis.

EXAMPLE 2

Finely divided thallous chloride (TlCl) was suspended in hydrochloric acids of varied concentrations at the concentration of 0.0125 mol/l., and in each of the suspensions 70 mols of cupric chloride ($CuCl_2$) per mol of the thallous chloride (TlCl) were dissolved. Each of the systems was maintained at 70° C. in a reactor similar to that employed in Example 1, and air was blown thereinto until the thallous chloride (TlCl) was completely converted to thallic chloride and dissolved. The time required therefor in each case is shown in Table 2 below.

TABLE 2.—TIME REQUIRED FOR DISAPPEARANCE OF THALLOUS CHLORIDE

| Run No. | 1 | 2 | 3 | 4 | 5 |
| --- | --- | --- | --- | --- | --- |
| Concentration of hydrochloric acid (normal) | 0 | 1.2 | 3.0 | 4.8 | 7.0 |
| Time required for disappearance of Tl I (min.) | ∞ | [1] 30 | [1] 20 | 18 | 16 |

[1] Above.

EXAMPLE 3

In 250 ml. of a diluted aqueous solution of hydrogen bromide at pH 4.0, 50 g. of cupric bromide were dissolved and further 14.2 g. of thallous bromide were suspended therein. The system was then heated to the boiling point in the manner similar to Example 1. The water evaporated during the reaction was refluxed by means of a reflux condenser. The pH of the reaction liquid was continuously measured with a glass electrode pH meter for high temperature use inserted in the reactor and in order to maintain the pH of the reaction system always at 4.0, hydrobromic acid was occasionally added to the system.

After 40 hours of the reaction, the concentration of the thallic compound formed was 0.030 mol/l.

EXAMPLE 4

16.6 grams of basic cupric carbonate ($CuCO_3 \cdot Cu(OH)_2 \cdot H_2O$) were dissolved in 250 ml. of an aqueous solution of hydrogen bromide, and in the solution 14.2 g. of thallous bromide (TlBr) were suspended (concentration of HBr, 2.572 mol/l.; that of thallous bromide, 0.20 mol/l.). The system was heated to 70° C. in a reactor provided with a stirrer and an air inlet under violent stirring while air was blown thereinto. Small portions of the system were taken out at regular time intervals as the reaction proceeded, and the thallic bromide ($TlBr_3$) concentration was measured. The results are shown in Table 3 below.

TABLE 3

| Reaction time (hrs.) | Tl III concentration (mol/l.) |
|---|---|
| 0 | 0 |
| 1 | 0.069 |
| 2 | 0.120 |
| 4 | 0.173 |

When oxygen was used in place of air, the reaction rate was approximately doubled.

Separately, 25.6 g. of cupric chloride ($CuCl_2 \cdot 2H_2O$) were dissolved in an aqueous solution of a mixture of hydrogen bromide and hydrogen chloride, and in which 12.0 g. of thallous chloride (TlCl) were suspended (concentration of thallous chloride, 0.20 mol/l.) therein.

The ion concentrations in the above aqueous solution were: $H^+$, 2.172; $Cu^{++}$, 0.599; $Br^-$, 1.001; and $Cl^-$, 2.398 (all in terms of mol/l.).

This suspension was reacted while air was blown thereinto similarly to the foregoing. The results are shown in Table 4 below.

TABLE 4

| Reaction time (hrs.) | Tl III concentration (mol/l.) |
|---|---|
| 0 | 0 |
| 1 | 0.055 |
| 2 | 0.093 |
| 4 | 0.133 |

When thallous sulfate ($Tl_2SO_4$) was used in place of thallous chloride (TlCl), substantially the same result was obtained.

EXAMPLE 5

Finely divided thallous chloride (TlCl) was suspended in 6 N aqueous solution of hydrochloric acid at a concentration of 0.01 mol/l., in which each varied amount of cupric chloride ($CuCl_2$), ferric chloride ($FeCl_3$) or cobaltic chloride ($CoCl_3$) was dissolved. Each system was maintained at 70° C. in a reactor similar to that used in Example 1 while air was blown thereinto, and the time required before the thallous chloride (TlCl) was completely converted to thallic chloride and dissolved was measured. The results are shown in Table 5 below.

TABLE 5–2.—TIME REQUIRED FOR DISAPPEARANCE OF Tl I WHEN FERRIC CHLORIDE WAS USED

| Run No. | 1 | 2 | 3 | 4 |
|---|---|---|---|---|
| Molar ratio of $CuCl_2$/TlCl | 1 | 5 | 10 | 45 |
| Time required for disappearance of Tl I (min.) | 16 | 13 | 11 | 9 |

TABLE 5–2.—TIME REQUIRED FOR DISAPPEARANCE OF Tl I WHEN FERRIC CHLORIDE WAS USED

| Run No. | 1 | 2 | 3 | 4 | 5 | 6 |
|---|---|---|---|---|---|---|
| Molar ratio of $FeCl_3$/TlCl | 1 | 2 | 10 | 20 | 40 | 100 |
| Time required for disappearance of Tl I (min.) | 34 | 33 | 25 | 21 | 18 | 16 |

TABLE 5–3.—TIME REQUIRED FOR DISAPPEARANCE OF Tl I WHEN COBALTIC CHLORIDE WAS USED

| Run. No. | 1 | 2 |
|---|---|---|
| Molar ratio of $CoCl_3$/TlCl | 1 | 20 |
| Time required for disappearance of Tl I (min.) | [1] 40 | [1] 38 |

[1] Above.

EXAMPLE 6

In 250 ml. of about 2.0–2.2 mol/l. aqueous solution of hydrochloric acid, 25.6 g. of cupric chloride ($CuCl_2 \cdot 2H_2O$) and a salt varied in each run as indicated in Table 6 were dissolved. Further in each of the solutions 6.0 g. of thallous chloride (TlCl) were suspended. Each system was put in a reactor provided with an air inlet and a stirrer, and heated to 70° C. under violent stirring while air was blown thereinto. The results are shown in Table 6 below.

TABLE 6

| Run No. | Type of salt | Concentration of salt (mol/l.) | Concentration of Tl III (mol/l.) Reaction time, 2 hrs. | Reaction time, 4 hrs. | Reaction time, 8 hrs. |
|---|---|---|---|---|---|
| 1 | | 0 | 0.010 | 0.018 | 0.030 |
| 2 | NaCl | 0.50 | 0.018 | 0.031 | 0.051 |
| 3 | NaCl | 1.00 | 0.026 | 0.043 | 0.069 |
| 4 | NaCl | 2.00 | 0.037 | 0.062 | 0.101 |
| 5 | KCl | 0.08 | 0.027 | 0.048 | 0.076 |
| 6 | LiCl | 1.00 | 0.032 | 0.052 | 0.074 |
| 7 | $CaCl_2$ | 0.58 | 0.031 | 0.050 | 0.073 |
| 8 | NaBr | 1.00 | 0.067 | 0.105 | |
| 9 | NaCl [1] | 1.00 | 0.060 | 0.090 | 0.137 |
| 10 | NaCl [2] | 1.00 | 0 | 0 | 0 |

[1] Oxygen was used in place of air.
[2] Nitrogen was used in place of air.

EXAMPLE 7

This example shows that the oxidation reaction in accordance with the present invention is operable, so far as hydrochloric acid is present, for any Tl I with any anion of metallic compounds which show multiple oxidation reduction stages under the conditions of the said oxidation reaction.

Various monovalent thallium compounds and copper compounds of iron compounds as identified in Table 7 below were each added to 6 N aqueous solution of hydrochloric acid, and heated to 70° C. for an hour while air was blown thereinto. The Tl III resultantly formed in each system was determined by means of iodometry. The results are shown in Table 7.

TABLE 7

| Run No. | Concentration of Tl I (mol/l.) | | Concentration of Cu II or Fe III compound (mol/l.) | | Yield of Tl III (based on Tl I) (mol percent) |
|---|---|---|---|---|---|
| 1 | TlCl | 0.025 | $CuCl_2$ | 0.075 | 96 |
| 2 | $Tl_2SO_4$ | 0.025 | $CuCl_2$ | 0.050 | 93 |
| 3 | $Tl_2SO_4$ | 0.025 | $CuSO_4$ | 0.100 | 97 |
| 4 | $Tl_2SO_4$ | 0.010 | $Fe_2O_3$ | 0.100 | 81 |
| 5 | TlOAC | 0.025 | $Cu(OAC)_2$ | 0.100 | 92 |
| 6 | TlOAC | 0.010 | $CuSO_4$ | 0.075 | 90 |
| 7 | TlOH | 0.025 | $CuCl_2$ | 0.075 | 97 |
| 8 | TlOH | 0.025 | $FeCl_3$ | 0.100 | 86 |
| 9 | TlOH | 0.010 | $CuSO_4$ | 0.050 | 95 |

EXAMPLE 8

In 250 ml. of 4 N aqueous solution of sulfuric acid 25.0 g. of copper sulfate ($CuSO_4 \cdot 5H_2O$) and 1.2 g. of sodium bromide were dissolved, and 6.2 g. of thallous sulfate was added to the solution. The system was then heated to 100° C. for 40 hours in the manner similar to Example 1.

The concentration of the thallic ion formed was 0.012 mol/l.

Control

For comparison, thallous chloride (TlCl) was contacted with air and reacted for 4 hours in the same manner as described in the latter half of Example 4, using each varied acid as identified in Table 8 below in place of the mixed liquid of HBr and HCl. The results are shown in Table 8 below.

TABLE 8

| Type of acid | Concentration of acid (mol/l.) | Concentration of Tl III (mol/l.) |
|---|---|---|
| Hydrogen fluoride (HF) | 0 | 0 |
| | 2.40 | 0 |
| Hydrogen chloride (HCl) | 2.17 | [1] 0.025 |
| Hydrogen iodide (HI) | 2.32 | [1] 0.013 |
| Sulfuric acid ($H_2SO_4$) | 1.08 | 0 |
| Acetic acid ($CH_3COOH$) | 4.27 | 0 |
| Hydrogen bromide (HBr) | 2.07 | } 0.017 |
| Sodium acetate ($CH_3COONa$) | 4.86 | |
| Hydrogen bromide (HBr) | 2.48 | [2] 0 |

[1] The value obtained by iodometry.
[2] Nitrogen gas was used in place of air.

We claim:
1. A process for converting a monovalent thallium compound to a trivalent thallium compound which comprises contacting the monovalent thallium compound in an acidic aqueous medium having a pH of not more than 6 and containing chloride ions or bromide ions with molecular oxygen and a metal ion selected from the group consisting of copper, iron, cobalt, mercury, chromium, manganese, and nickel ions, the monovalent thallium compound being at least slightly soluble in said acidic aqueous medium.

2. The process of claim 1, wherein said acidic aqueous medium has a pH of not more than 4.

3. The process of claim 1, wherein said metal ion is selected from copper and iron ions.

4. The process of claim 1, wherein said acidic aqueous medium containing chloride ions comprises an aqueous solution of hydrochloric acid.

5. The process of claim 1, wherein said acidic aqueous medium containing bromide ions comprises an aqueous solution of hydrobromic acid.

6. The process of claim 1 wherein said chloride ions or bromide ions are added to said acidic aqueous medium by the addition of the corresponding alkali metal or alkaline earth metal chlorides or bromides.

7. The process of claim 1 wherein said metal ion comprises copper added to said acidic aqueous medium in the form of a copper compound selected from the group consisting of organic acid salts, inorganic acid salts, oxides and hydroxides.

8. The process of claim 1 wherein said metal ion comprises iron added to said acidic aqueous medium in the form of an iron compound selected from the group consisting of organic acid salts, inorganic acid salts, oxides and hydroxides.

References Cited

UNITED STATES PATENTS 3,048,636   8/1962   Grinstead _____ 252—416 X

OTHER REFERENCES

Jacobson, "Encyclopedia of Chemical Reactions," vol. VII, Reinhold Publishing Corp., New York, 1958, pp. 233, 238.

Pascal, "Nouveau Traite De Chimie Minerale," Tome VI, Masson et Cie, Paris, 1961, pp. 911–912.

OSCAR R. VERTIZ, *Primary Examiner.*

H. T. CARTER, *Assistant Examiner.*